United States Patent [19]
Hayashi

[11] 3,972,409
[45] Aug. 3, 1976

[54] TRANSFER DEVICE AND METHOD

[76] Inventor: Torahiko Hayashi, 3-4, Nozawa, Ytsunomiya, Tochigi, Japan

[22] Filed: Oct. 25, 1974

[21] Appl. No.: 518,210

[30] Foreign Application Priority Data
Oct. 25, 1973  Japan.............................. 48-120330

[52] U.S. Cl. ............................ 198/31 AC; 198/27; 198/31 AA; 214/6 DK; 271/189
[51] Int. Cl.²........................................ B65G 47/26
[58] Field of Search............ 198/20 R, 21, 27, 31 R, 198/31 AA, 31 AC, 37, 94, 99, 203; 53/247; 214/6 D, 1 BD, 6 DK; 271/189, 191

[56] References Cited
UNITED STATES PATENTS

| | | | |
|---|---|---|---|
| 2,591,339 | 4/1952 | Davis................................... | 198/27 |
| 3,348,678 | 10/1967 | Flowers.......................... | 198/31 AC |
| 3,444,982 | 5/1969 | Greiner............................ | 198/20 R |
| 3,842,963 | 10/1974 | Kemper.......................... | 198/31 AC |

*Primary Examiner*—Evon C. Blunk
*Assistant Examiner*—Joseph E. Valenza
*Attorney, Agent, or Firm*—Guy W. Shoup

[57] ABSTRACT

A transfer device for transferring articles in one or more lines to a subsequent station simultaneously comprising a first belt conveyor suspended from a fulcrum shaft and a second belt conveyor positioned underneath said first belt conveyor at right angles thereto, the first belt conveyor being swung periodically so as to transfer articles thereon to said second conveyor.

3 Claims, 6 Drawing Figures

TRANSFER DEVICE AND METHOD

FIELD OF THE INVENTION

The present invention relates to an automatic device for transferring articles such as confectionery, bread and similar materials fed on a conveyor from said conveyor to article carrying plates or transferring packed articles fed on a conveyor into boxes.

BACKGROUND OF THE INVENTION

In the past, no transfer device has been known that can transfer articles arranged and conveyed continuously in one or more lines on a conveyor to a receiving conveyor in such a manner that the articles are rearranged on the receiving conveyor in a plurality of lines as desired.

Neither has there been any transfer device which can readily transfer a plurality of articles from a conveyor simultaneously into separate sections of partitioned containers in a certain arrangement.

There is a prior art device, wherein a feed conveyor carries articles in plural lines and transfers them onto boxes or carrying plates. In that device, it is necessary that the desired number of lines of articles are prearranged on the feed conveyor. This device cannot transfer articles so that the articles may be arranged on the receiving conveyor in a desired number of lines irrespective of the number of lines of articles on the feed conveyor.

In another known transfer device, the arrangement of articles on the receiving conveyor in a desired number of lines is possible only when the articles are placed on the feed conveyor in one longitudinal line. The operation of an example of the above device is illustrated in FIG. 1, a cross sectional schematic view of the device, wherein articles 1 are conveyed in one line onto a feed conveyor 2. A plurality of articles 1 forming a line are pushed laterally in the direction of $a$ by a pusher bar 3 moving transversely of the direction of the conveyor 2, so that the articles 1 drop off the conveyor 2 in the direction of $a'$. The device is not satisfactory in that articles are sometimes injured, and that a precise arrangement of articles is not possible because the articles are likely to roll about when they drop onto the receiving conveyor.

Referring to FIG. 2, which illustrates a second example of the above device, a stop plate 4 is fixedly provided at a position at a side of a feed conveyor, said stop plate being arranged to be pulled quickly in the direction of $b$. In this instance, articles 1 are transferred to a receiving conveyor in a substantially regular arrangement. It cannot, however, be completely assured that there is no rolling of the articles on the receiving conveyor. Some of the articles may fall diagonally due to a braking action caused by the contact of the articles with the stop plate 4. There have also been accidents in this type of device in which articles are nipped in the gap between the stop plate 4 and the feed conveyor 2. Further, in case articles are sticky like confectionery, the upper surface of the feed conveyor 2 and the bottom surface of the articles stick together due to a substantial friction, which fact has made it difficult to operate the device continuously for a long period of time.

Another device is described in my U.S. Pat. No. 3,877,563 issued Apr. 15, 1975.

SUMMARY OF THE INVENTION

The present invention provides a transfer device which eliminates all of the inconveniences accompanied by the prior art devices, and is an improvement over them. More specifically, the present invention provides a transfer device for transferring articles in one or more lines to a subsequent station simultaneously, comprising a first belt conveyor supported by and swingable about a fulcrum shaft positioned thereabove and sideways from the space vertically above the passage of articles on said conveyor, means to periodically rotate said fulcrum shaft so as to swing said conveyor about said fulcrum shaft in an abrupt manner, and a second conveyor positioned underneath said first conveyor, fixed in a direction at right angles thereto, and adapted to convey containers such as article carrying plates and boxes, whereby the abrupt swinging motion of said first conveyor causes articles thereon to be transferred to said second conveyor or containers thereon.

Transferred articles form on said second conveyor or containers thereon a desired number of lines. Upon transfer, articles are aligned on the second conveyor etc. precisely as desired. Articles are not injured by transfer actions.

Thus, an object of the present invention is to provide a transfer device for transferring articles in one or more lines from a first conveyor to a second conveyor simultaneously in such a manner that articles are precisely aligned, forming a desired number of lines on the second conveyor, without being subjected to any injury by the transfer motions.

BRIEF DESCRIPTION OF THE DRAWINGS

The above and other objects, features and advantages of the invention will be apparent in the following detailed description of illustrative embodiments thereof which is to be read in connection with the accompanying drawings wherein.

DETAILED DESCRIPTION OF THE INVENTION

Figure 4:
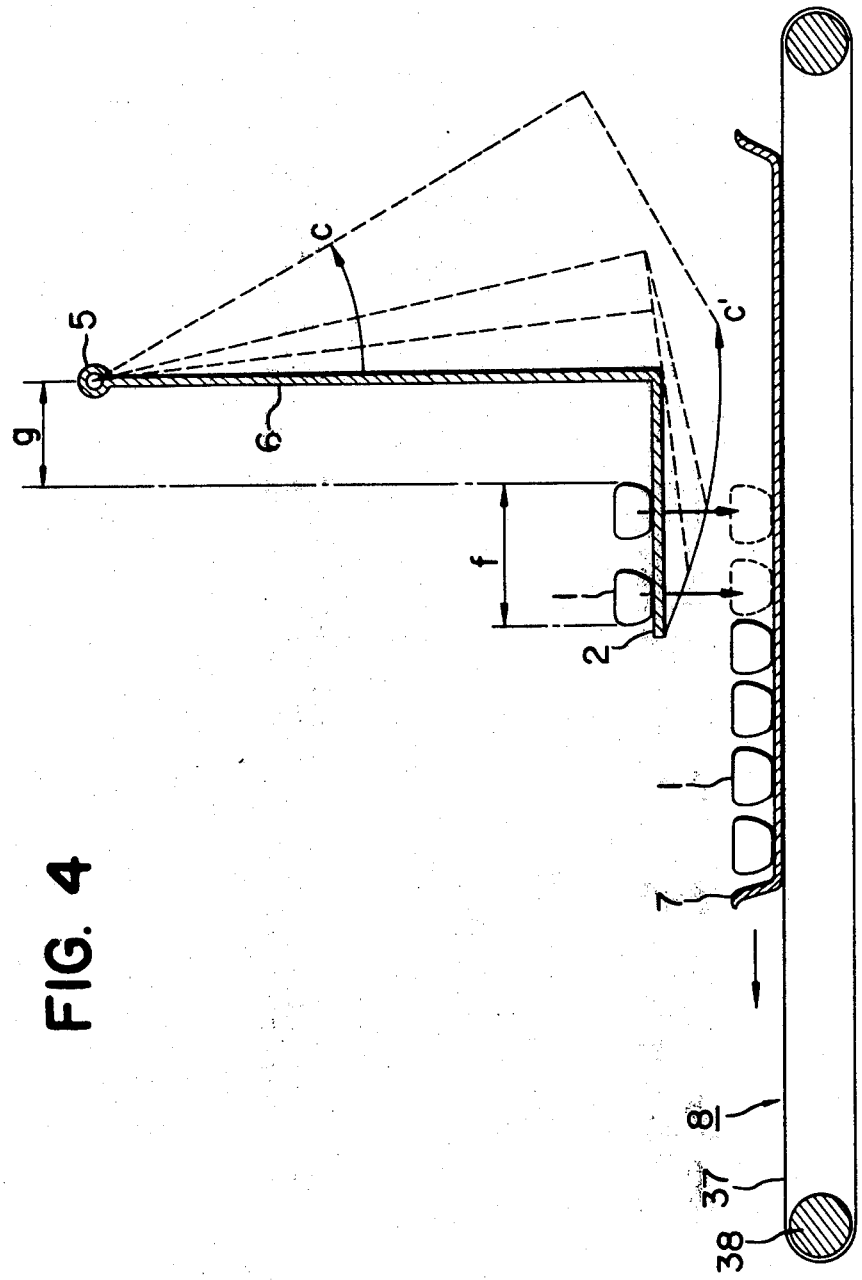
FIG. 4 is a schematic view in cross section of the device of the present invention illustrating its functions.
Figure 5:
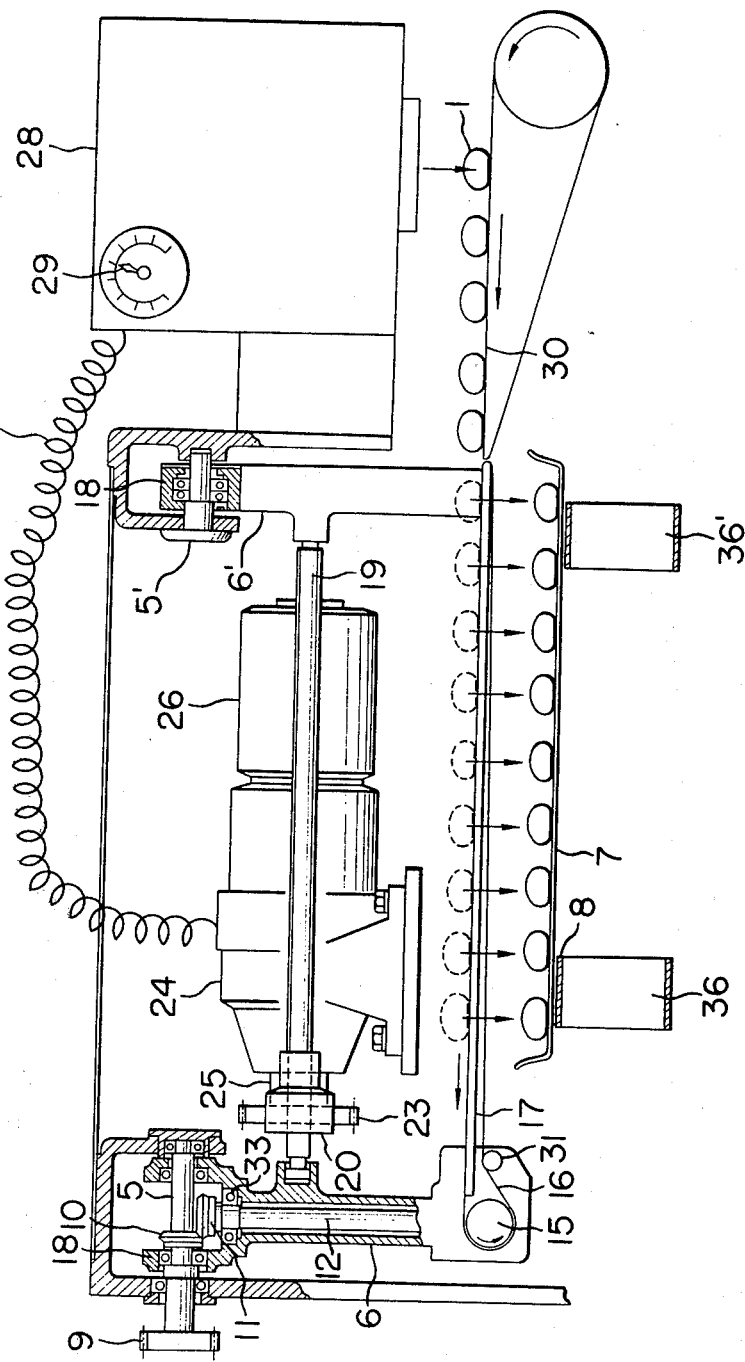
FIG. 5 is a schematic view in vertical section of the device of the present invention.
Figure 6:
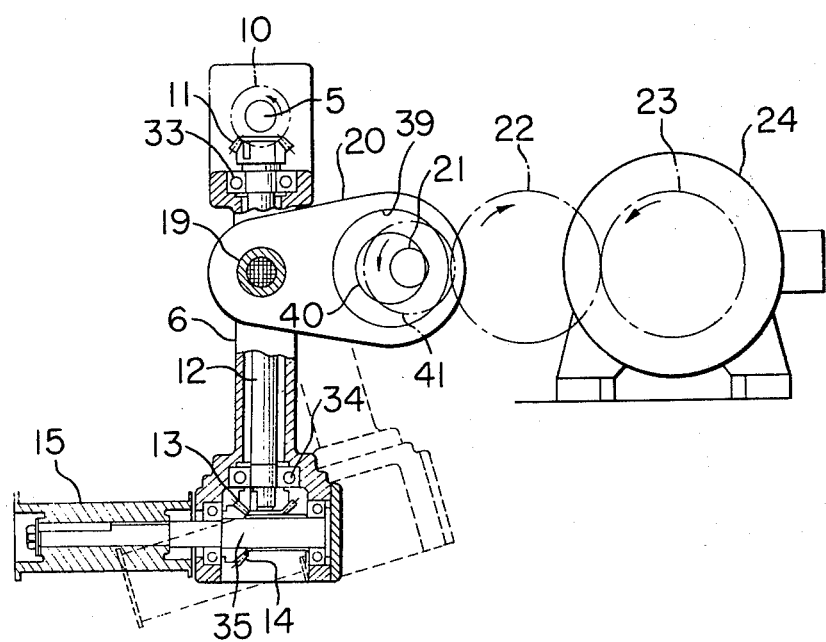
FIG. 6 is a schematic view illustrating the transmission mechanism for the device of the present invention.

Referring to FIGS. 4 through 6, the main structure of the device of the present invention comprises a feed conveyor 2. Said conveyor 2 consists of an endless belt 16 entrained around a drive roller 15, a tension roller 31 and a support plate 17. The support plate 17 is a flat piece of plate and extends substantially the entire length of the conveyor 2. The support plate 17 is held at its two ends by arms 6, 6' at the bottom ends of the latter. The arms 6, 6' swingably hang downwardly from horizontal fulcrum shafts 5, 5' respectively. The upper end of each of the arms 6, 6' forms a horizontal sleeve, which is mounted on the fulcrum shaft. Each of the arms 6, 6' is arranged to swing readily by bearings 18 placed between the fulcrum shaft and the inner surface of the above. The arm 6 has a hollow portion therein in substantially its entire length, forming a cylinder. A shaft 12 is inserted in the hollow portion and mounted therein as described below.

The fulcrum shaft 5 is axially aligned with the fulcrum shaft 5'. The fulcrum shafts 5, 5' are positioned sideways from the space vertically above the passage of articles or the article carrying area $f$ on the feed-in conveyor 2. The fulcrum shafts 5, 5' may be spaced apart in the horizontal direction from the article carrying area $f$, the horizontal distance of the space between the article carrying area $f$ and the fulcrum shaft 5 being indicated by $g$ in FIG. 4.

The fulcrum shaft 5 is provided with a gear 9 at an end thereof. The gear 9 is connected to a motor by a conventional transmission device (not illustrated). The shaft 5 is also provided in the middle of its length with a bevel gear 10, which meshes with a bevel gear 11 connected to the uppermost end of the shaft 12. The shaft 12 is supported by bearings 33, 34 positioned between the shaft 12 and the inner surface of the arm 6, at the upper and lower ends of the shaft 12. A bevel gear 13 is mounted to the bottom end of the shaft 12, and said gear 13 meshes with a bevel gear 14 mounted to a horizontal shaft 35. The drive roller 15 is fixedly mounted on the shaft 35. Thus the rotation of the gear 9 causes the bevel gears 10, 11 to rotate. The rotation of the bevel gear 11 in turn rotates the shaft 12, bevel gears 13, 14 and eventually the drive roller 15. The belt 16 may be driven continuously.

Underneath the feed-in conveyor 2 is provided a takeout conveyor or a receiving conveyor assembly 8 whose direction of movement crosses that of the feed-in conveyor 2 at right angles to each other. The take-out conveyor assembly 8 consists of two parallel conveyors 36, 36' spaced apart from each other at a distance corresponding to the length of the feed-in conveyor 2. Each of the take-out conveyors 36, 36' comprises an endless belt 37 entrained around rollers, one of which is illustrated in FIG. 4 as with a reference number 38. The take-out conveyor 36, 36' is adapted to support a container or a tray 7 which is placed on the conveyors so as to extend over the two conveyors as in FIG. 5. The conveyor 8 is driven by a conventional driving means not illustrated in the drawings. The take-out conveyor 8 causes a container 7 to progress thereon.

Between the arms 6, 6', halfway between the length of each of the arms, is provided a pull bar 19. The two ends of the pull bar 19 are rotatably mounted to the arms 6, 6'. The pull bar 19 is also rotatably connected to an end of a crank 20. Toward the other end of the crank 20 is provided a hole 37, into which is inserted a plate 38 mounted to an eccentric shaft 21, eccentrically thereto. Referring to FIG. 6, there is an even gap between the periphery of the plate 38 and the inner surface of the hole 37. Roll bearings (not shown) may be inserted into the gap between the plate 38 and the inner surface of the hole 37. The position of the shaft 21 is thus eccentric to the hole 37. The shaft 21 is rotatably mounted to a frame of the device, not shown in the drawings. At the other end of the eccentric shaft 21 is provided a grear 39 concentric to the shaft 21 and meshes with a gear 22. The gear 22 in turn meshes with a gear 23. The gear 23 is mounted to the output shaft 25 of an electromagnetic clutch 24. The clutch 24 is operatively connected to a motor 26. The rotation of the motor 26 is transmitted through the electromagnetic clutch 24 and the gears 23, 22 to the eccentric shaft 21. The directions of rotation of the gears 23, 22, 39 are illustrated by the arrows in FIG. 6. When the shaft 21 rotates, the plate rotates so as to push the crank 20 to the right in FIG. 6 via the roll bearings, causing the crank 20 to pull the shaft 19, which in turn causes the feed-in conveyor 2 to swing as illustrated by the phantom lines in FIG. 6. When the shaft continues its rotation, the plate 38 also continues its rotation and starts pushing the crank 20 to the left in FIG. 6 and returns to its position as illustrated in FIG. 6. Thus, the crank 20 and the arms 6, 6' then move back to its original position. As an alternative, the gap between the crank 20 and the inner surface of the hole 37 may be hollow, without any roll bearings. In this case, when the shaft 21 rotates, the plate 38 comes into contact with a portion of the inner surface of the hole 37 and pushes the crank 20 to the right in FIG. 6, causing the crank 20 to pull the shaft 19, which in turn causes the feed-in conveyor 2 to swing. When the shaft 21 continues its rotation, the plate 38 becomes separated from the inner surface of the hole 37 and returns to is portion as illustrated in FIG. 6. The crank 20 and the arms 6, 6' then return to their original positions by the gravity of the arms 6, 6' and the feed-in conveyor 2.

An article producing machine 28 produces articles 1 and drops produced articles successively onto a belt conveyor 30, which is positioned upstream of the feed-in conveyor 2 adjacent thereto. The movement of the belt of the belt conveyor 30 supplies articles 1 to the feed-in conveyor 2. The space between each adjacent article 1 can be readily adjusted by adjusting the operation of the machine 28 or the velocity of movement of the conveyor 30. Thus, articles can be fed to the feed-in conveyor 2 in such a manner that they are spaced apart from each other at same distances. The article producing machine 28 may be in such a structure that a plurality of articles 1 are produced simultaneously and dropped onto the conveyor 30 so that they are aligned laterally at right angles to the direction of movement of the conveyor 30. In this instance, a plurality of lines of articles 1 can be formed on the conveyor 30, and consequently on the feed-in conveyor 2.

The machine 28 is produced with a memory-type counter dial 29, which sends signals through a signal line 27 connected thereto at each time the machine has produced a predetermined number of articles which number is indicated by the dial 29. Upon receipt of a signal from the dial 29, the electromagnetic clutch 24 transmits the rotational movement of the motor 26 to the eccentric shaft 21 so as to rotate it quickly by one revolution and then stop it. Thus, the clutch 24 causes the feed-in conveyor 2 to move quickly in the lateral direction and then to return to its original position. Since the motion of the feed-in conveyor 2 is sufficiently quick, articles 1 can be transferred to the take-out conveyor 8 while the belt 16 is running.

Figure 1:
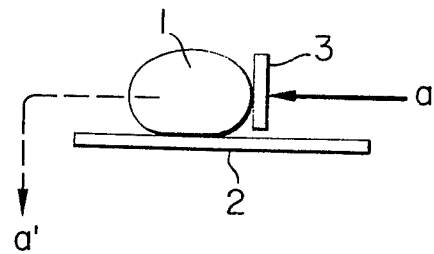
FIG. 1 is a schematic view of a conventional device of the type similar to the device of the present invention, illustrating the function of said conventional device.
Figure 2:
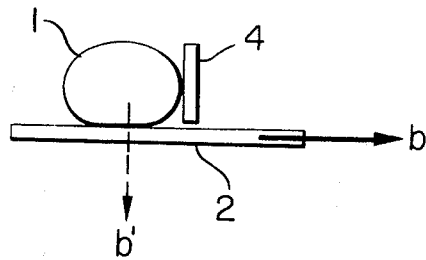
FIG. 2 is a similar view of a different conventional device.
Figure 3:
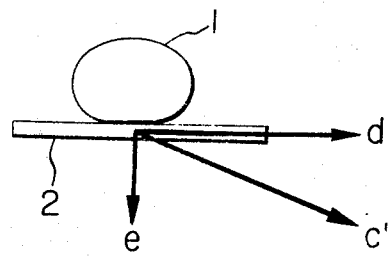
FIG. 3 is a schematic view illustrating the directions of forces applicable to the device of the present invention.

Turning to the operational relationship between various parts of the device of the present invention with reference to FIGS. 3 and 4, if the arm 6 is pulled in the direction of $c$ the feed-in conveyor 2 moves following the locus indicated by the line $c'$. The direction of movement $c'$ is a composite of the directions of movement $d$ and $e$, as illustrated in FIG. 3. If the movement $c'$ is carried out quickly, the article 1 remains still for a short moment due to its inertia, without being influenced by any stress from outside or friction, and then drops vertically downwardly without changing its horizontal position onto the take-out conveyor 8 or a container 7 placed upon said conveyor 8. The take-out conveyor takes up articles 1 and takes them out to a subsequent station (not illustrated).

If it is necessary to increase the distance of movement of the feed-in conveyor 2 in the direction of e in FIG. 3, the fulcrum shaft 5 may be spaced apart in a greater distance in the horizontal direction from the article carrying area f. If the distance of movement in the direction of d should be increased, the distance of pull in the direction of c should be increased.

The distance of movement of the feed-in conveyor 2 in the direction of e should be determined based upon the calculation of the speed of the pulling in the direction of c, which should be fast enough to outstrip the falling movement of the articles. A test was conducted with articles 1 which are unstable and sticky cakes as illustrated in FIG. 4, 30 mm in diameter in the upper portion, 25 mm in diameter in the lower portion and 30 mm in height. The above cakes were fed in two lines and were dropped simultaneously so as to transfer them to the take-out conveyor. According to the test, it was possible to drop the articles 1 vertically downwardly without any friction between them and the upper surface of the feed-in conveyor 2 when the length of g was set at 150 mm, the length of the arm 6 at 275 mm and the velocity of movement of the feed-in conveyor 2 in the direction of e at 1920 mm per second. The test demonstrated that the present invention has achieved great efficiency as compared to the one-line supply of the conventional device described above.

The number of longitudinal lines of the articles on the take-out conveyor 8 can be determined as desired by setting the dial 29 at the desired number. In other words, the number of articles in any of the longitudinal lines formed on the feed-in conveyor 2 before it is pulled sideways determines the number of longitudinal lines of the articles on the take-out conveyor 8.

Further, the space between any laterally adjacent articles on the receiving conveyor can be adjusted by changing the gear 9 so as to change the velocity of the endless belt 16. Also, the space between any adjacent articles in the axial direction of the receiving conveyor can be adjusted by changing the velocity of movement of the conveyor 8.

The above description concerns itself with only one embodiment of the invention and any alterations may be made to the above without changing the scope of the present invention. By way of a mere example, one of the arms 6' may be omitted and the arm 6 may be placed in the center of the feed-in conveyor 2. In this instance the fulcrum shaft 5' may also be elminated.

Further, it is desirable that the fulcrum shaft 5 rotates in the direction of movement of the first conveyor away from its stationary position. This causes the fulcrum shaft 5 to stop its rotation while the first conveyor moves away from its stationary position during its swinging motion, if the relation between the velocity of rotation of the fulcrum shaft 5 and the velocity of the swinging motion of the first conveyor is adjusted appropriately. The above causes articles on the first conveyor to fall vertically downwardly when said conveyor is swung.

The second conveyor may be of any suitable type other than a belt conveyor, for instance, a roller conveyor.

What is claimed is:

1. Apparatus for transferring formed articles such as confectionery, bread and the like arranged on a conveyor in one or more lines to a subsequent station simultaneously, comprising a first belt conveyor swingably supported by at least one fulcrum shaft axially extending parallel to the longitudinal axis of the first belt conveyor positioned thereabove and offset from the passage of articles on said first belt conveyor, means to swing laterally said conveyor about said fulcrum shaft in an abrupt manner, and a second conveyor positioned underneath said first conveyor in a substantially lateral direction adapted to convey containers such as article supporting surfaces and containers, whereby the abrupt receding motion of said first conveyor from beneath said articles causes articles thereon to be directly transferred right side up to said second conveyor or said containers thereon.

2. Apparatus according to claim 1, wherein said fulcrum shaft is rotatable by a drive means in the direction of movement of said first conveyor away form its stationary position said first conveyor is connected to said fulcrum shaft by a vertical arm, said vertical arm containing a vertical shaft rotatably mounted therein, a horizontal shaft, said vertical shaft being connected at its lower end by means of gears to said horizontal shaft, a drive roller mounted on said horizontal shaft adapted to rotate the belt on said first conveyor, said vertical shaft being being connected at its upper end by means of bevel gears to said fulcrum shaft, whereby the rotation of the fulcrum shaft is transmitted to said first conveyor;

said fulcrum shaft being swingable while driving said first conveyor.

3. A method for transferring formed articles such as confectionary, bread and the like arranged in one or more lines to a subsequent station simultaneously, comprising placing said articles in one or more lines on a first conveyor swingably hung from one or more fulcrum shafts positioned offset from the passage of articls on said conveyor, swinging said conveyor abruptly sideways wherein it recedes from beneath said articles, thereby transferring articles (on) from said conveyor right side up to a second conveyor positioned underneath said first conveyor in a substantially lateral direction by dropping them downwardly vertically.

* * * * *